(12) United States Patent
Wang et al.

(10) Patent No.: US 9,952,731 B2
(45) Date of Patent: Apr. 24, 2018

(54) TOUCH SCREEN AND TOUCH DISPLAY ELECTRONIC DEVICE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Lihua Wang, Shanghai (CN); Huiping Chai, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 197 days.

(21) Appl. No.: 15/166,545

(22) Filed: May 27, 2016

(65) Prior Publication Data
US 2017/0228063 A1  Aug. 10, 2017

(30) Foreign Application Priority Data

Feb. 5, 2016 (CN) .......................... 2016 1 0082555

(51) Int. Cl.
*G06F 3/045* (2006.01)
*G06F 3/044* (2006.01)
*G06F 3/047* (2006.01)
*G06F 3/041* (2006.01)

(52) U.S. Cl.
CPC .............. *G06F 3/044* (2013.01); *G06F 3/047* (2013.01); *G06F 3/0412* (2013.01)

(58) Field of Classification Search
None
See application file for complete search history.

(56) References Cited

U.S. PATENT DOCUMENTS

2016/0246408 A1* 8/2016 Wang ...................... G06F 3/044

FOREIGN PATENT DOCUMENTS

| CN | 104020891 A |   | 9/2014 |           |
|----|-------------|---|--------|-----------|
| CN | 104020906 A |   | 9/2014 |           |
| CN | 104714327 A | * | 6/2015 | G02F 1/1333 |

* cited by examiner

*Primary Examiner* — Ilana Spar
*Assistant Examiner* — Kirk Hermann
(74) *Attorney, Agent, or Firm* — Kilpatrick Townsend & Stockton LLP

(57) ABSTRACT

A touch screen and a touch display electronic device are provided. The touch screen includes a substrate; and an auxiliary electrode layer, a common electrode layer and a wire layer arranged on a same side of the substrate. The common electrode layer and the wire layer are arranged opposite to each other in a direction perpendicular to the substrate. The common electrode layer includes multiple common electrode blocks having a same shape and a same area; each of the common electrode blocks includes a central electrode and sawtooth-shaped electrodes connected to the central electrode; and the sawtooth-shaped electrodes of any two adjacent common electrode blocks are fitted with each other. The wire layer includes multiple first wires connected to the multiple common electrode blocks. The auxiliary electrode layer includes multiple auxiliary electrode blocks. The sawtooth-shaped electrodes adjacent to edges of the substrate are fitted with the auxiliary electrode blocks.

13 Claims, 6 Drawing Sheets

US 9,952,731 B2

TOUCH SCREEN AND TOUCH DISPLAY ELECTRONIC DEVICE

CROSS REFERENCE OF RELATED APPLICATION

The present application claims the priority to Chinese Patent Application No. 201610082555.4, titled "TOUCH SCREEN AND TOUCH DISPLAY ELECTRONIC DEVICE", filed on Feb. 5, 2016 with the State Intellectual Property Office of the People's Republic of China, the content of which is incorporated herein by reference in its entirety.

FIELD

The present disclosure relates to the technical field of touch apparatus, and in particular to a touch screen and a touch display electronic device.

BACKGROUND

With the development of technology, more and more touch electronic devices are used in daily lives and work of people, bring great convenience and thus become indispensable tools for people.

Since an embedded self-capacitive touch screen has advantages of high touch accuracy, a high signal-to-noise ratio, it is commonly used in a touch electronic device. Reference is made to FIG. 1, which is a structural schematic diagram of a typical self-capacitive touch screen in the conventional technology. The self-capacitive touch screen includes a common electrode layer and a wire layer which are arranged opposite to each other and arranged in separate conductive layers. The common electrode layer includes multiple common electrode blocks 11. Each of the multiple common electrode blocks 11 is electrically connected to a touch detection chip through an individual terminal 16. Specifically, the wire layer includes multiple inner wires 12 electrically connected to the common electrode blocks 11 respectively. Each of the inner wires 12 is electrically connected to one of the common electrode blocks 11 through a respective first via hole 13, and is electrically connected to a respective peripheral wire 14 through a respective second via hole 15. The peripheral wire 14 is electrically connected to a respective terminal 16 in a binding region 17, and the terminals 16 are connected to the touch detection chip.

In the touch screen, the common electrode layer is dually used to perform touch detection. During a display phase, a common voltage signal is inputted to the common electrode blocks 11 to perform a display control. During a touch phase, when the touch screen is not touched by a human body, a capacitance on each of the common electrode blocks 11 is of a fixed value; and, when the touch screen is touched by a human body, a capacitance on a common electrode block in a touch location is of a value obtained by adding the fixed value and a value of capacitance caused by the touch of the human body. The touch detection chip may determine a touch location by detecting a variation of capacitance corresponding to each of the common electrode blocks 11 during the touch phase.

The touch screen in the structure as shown in FIG. 1, when performing touch detection, cannot detect different touch locations within a same common electrode block 11, resulting in low touch detection accuracy.

SUMMARY

To address the above issue, a touch screen and a touch display electronic device are provided according to the present disclosure to improve the touch detection accuracy. In order to achieve the above object, a technical solution is provided according to the present disclosure as follows.

A touch screen is provided. The touch screen can include a substrate, an auxiliary electrode layer, a common electrode layer and a wire layer arranged on a same side of the substrate. The common electrode layer and the wire layer are arranged opposite to each other in a direction perpendicular to the substrate. The common electrode layer includes multiple common electrode blocks having a same shape and a same area. Each of the common electrode blocks includes a central electrode and sawtooth-shaped electrodes electrically connected to the central electrode, and the opposite sawtooth-shaped electrodes of any two adjacent common electrode blocks are fitted with each other. The wire layer includes multiple first wires electrically connected to the multiple common electrode blocks in a one-to-one correspondence. The auxiliary electrode layer includes multiple auxiliary electrode blocks. The sawtooth-shaped electrodes adjacent to edges of the substrate are fitted with the auxiliary electrode blocks; and the common electrode blocks are configured to perform a control of image display by receiving the common voltage signal while a common voltage signal is inputted to the auxiliary electrode blocks.

Furthermore, a touch display electronic device is further provided according to the present disclosure, which includes the touch screen described above.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained based on these drawings without any creative work.

DETAILED DESCRIPTION OF EMBODIMENTS

Figure 1:
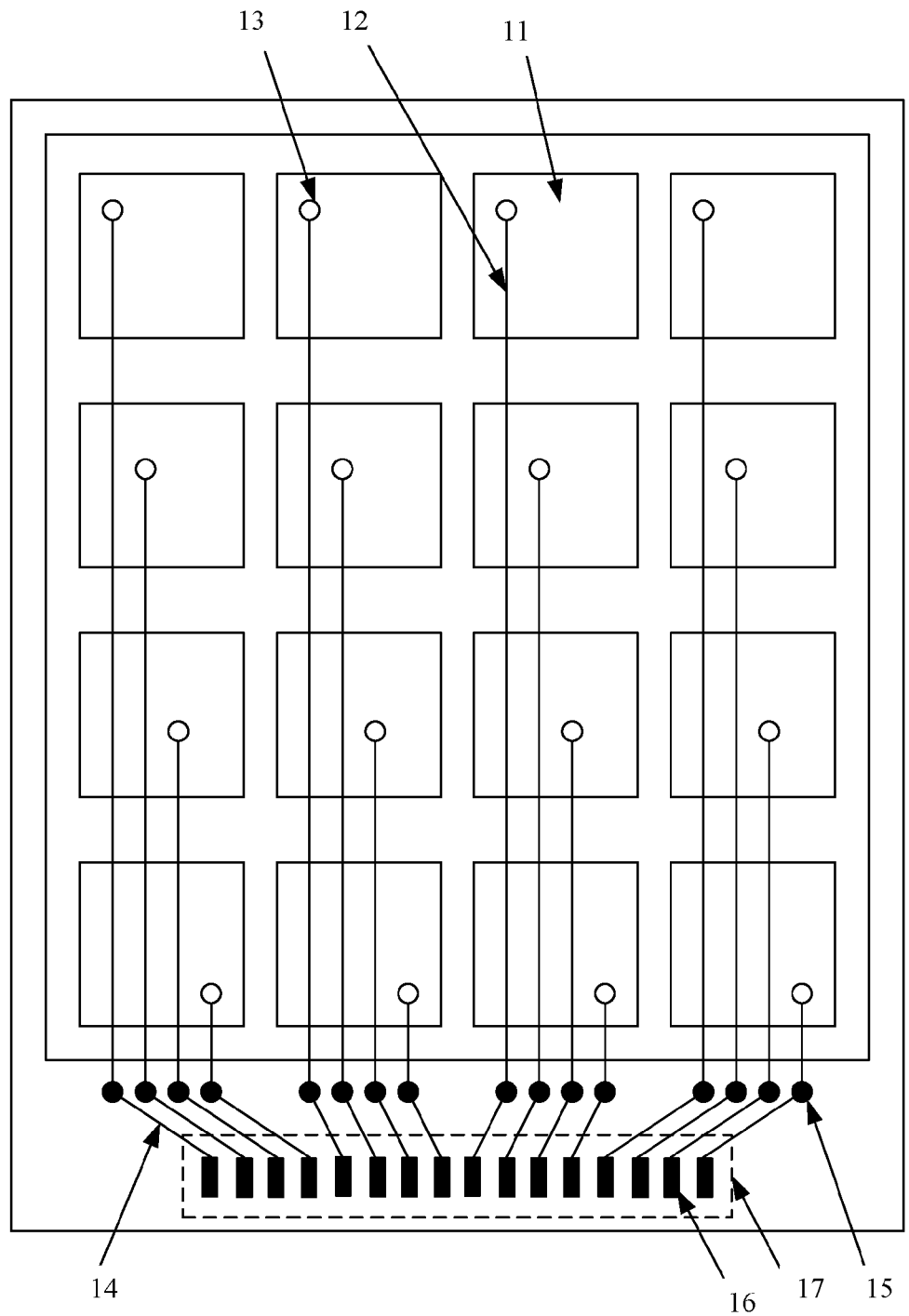
FIG. 1 is a structural schematic diagram of a typical self-capacitive touch screen in the conventional technology.

The technical solutions according to the embodiments of the present disclosure are described clearly and completely in conjunction with the drawings hereinafter. It is apparent that the described embodiments are only a few rather than all of the embodiments according to the present disclosure. Any other embodiments obtained by those skilled in the art based on the embodiments in the present disclosure without any creative work fall into the scope of the present disclosure.

The touch detection accuracy may be improved by dividing a common electrode layer into multiple electrode blocks having sawtooth-shaped structures at edges and fitting the sawtooth-shaped structures of any adjacent electrode blocks with each other. In a touch operation, when a central region of a common electrode block is touched, only the touched common electrode block generates a detection signal; and, when a sawtooth-shaped region where a common electrode block is fitted with another common electrode block, both of the common electrode blocks having the touched sawtooth-shaped region generate detection signals, improving the touch detection accuracy.

It is discovered that, although the touch detection accuracy may be improved by dividing the common electrode layer into multiple electrode blocks having sawtooth-shaped structures at edges and fitting the sawtooth-shaped structures of any adjacent electrode blocks with each other, the sawtooth-shaped structures at edges of the electrode blocks adjacent to edges of the substrate results in non-uniform edges of the common electrode layer towards the edges of the substrate, and further results in light leakage from pixel electrodes, which affects the quality of image display. The reason for the light leakage from the pixel electrodes is that a large hollow region of the common electrode layer is formed near the edge of the substrate due to the sawtooth-shaped structures of the common electrode blocks, and the hollow region results in light leakage from the pixel electrodes under the hollow region.

If edges of the common electrode blocks adjacent to the edges of the substrate are simply configured to be in a linear structure, then these common electrode blocks have a different shape from those common electrodes in the central region of the substrate, which results in the issue of visible edge shape. Furthermore, due to the different shapes of the common electrodes, the touch detection accuracy is affected, and electric fields between the pixel electrodes and the common electrode blocks become different, affecting a control of image display.

In order to address the above issue, a touch screen is provided according to an embodiment of the present disclosure. The touch screen includes a substrate, an auxiliary electrode layer, a common electrode layer and a wire layer arranged on a same side of the substrate. The common electrode layer and the wire layer are arranged opposite to each other in a direction perpendicular to the substrate. The common electrode layer includes multiple common electrode blocks having a same shape and a same area. Each of the common electrode blocks includes a central electrode and sawtooth-shaped electrodes electrically connected to the central electrode, and the opposite sawtooth-shaped electrodes of any two adjacent of the common electrode blocks are fitted with each other. The wire layer includes multiple first wires electrically connected to the multiple common electrode blocks in a one-to-one correspondence. The auxiliary electrode layer includes multiple auxiliary electrode blocks. The sawtooth-shaped electrodes adjacent to edges of the substrate are fitted with the auxiliary electrode blocks. The common electrode blocks to perform a control of image display by receiving a common voltage while the common voltage signal is inputted to the auxiliary electrode blocks.

In the touch screen, the common electrode blocks are configured to have a structure including sawtooth-shaped electrodes, by which the common electrode blocks are fitted with each other, thereby improving the touch detection accuracy. Furthermore, the auxiliary electrode blocks are arranged at edges of the common electrode layer to cause the edges of the electrode layer at the edges of the touch screen to be flush, thereby avoiding the issue of visible edge shape.

The core idea of an embodiment of the present disclosure will be discussed with reference to the drawings below.

Figure 2:
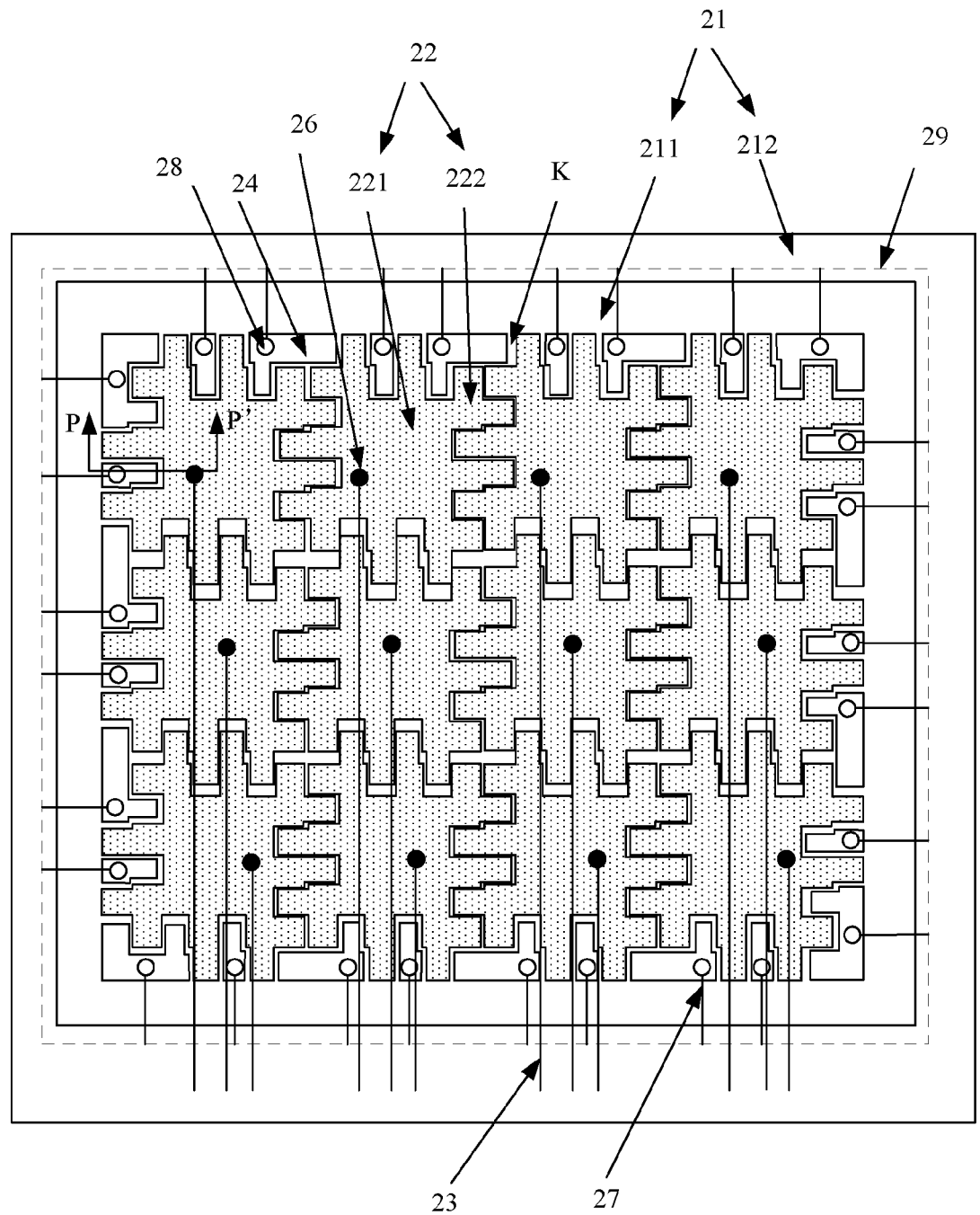
FIG. 2 is a top view of a touch screen according to an embodiment of the present disclosure.
Figure 3:
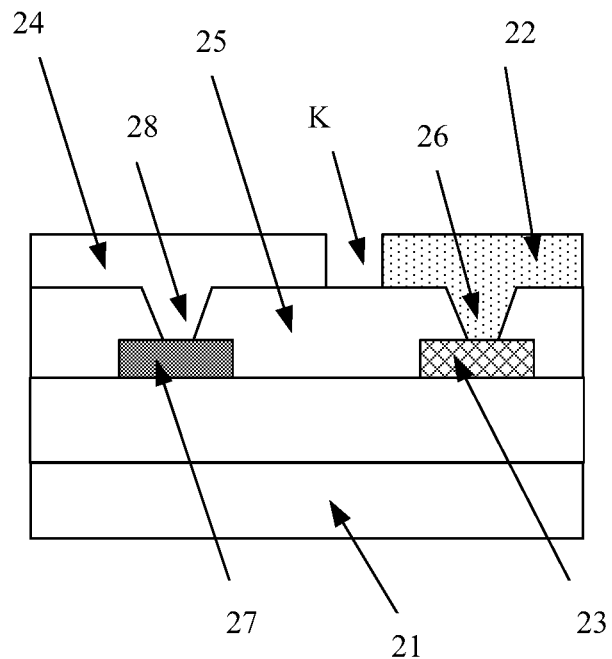
FIG. 3 is a sectional view along a line PP' in FIG. 2.
Figure 4:
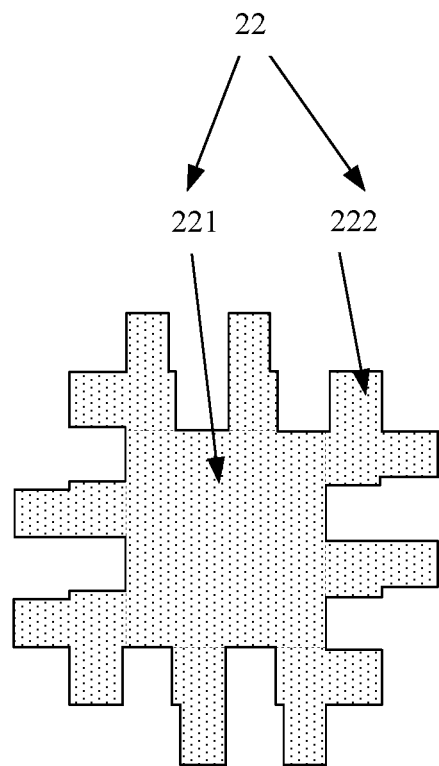
FIG. 4 is a structural schematic diagram of a common electrode block of the touch screen in FIG. 2.

Reference is made to FIG. 2 to FIG. 4. FIG. 2 is a top view of a touch screen according to an embodiment of the present disclosure, FIG. 3 is a sectional view along a line PP' in FIG. 2, and FIG. 4 is a structural schematic diagram of a common electrode block of the touch screen in FIG. 2. The touch screen includes a substrate 21; and an auxiliary electrode layer, a common electrode layer and a wire layer arranged on a same side of the substrate 21.

The substrate 21 includes a display region 211 and a border region 212 around the display region 211. A projection of the common electrode layer, a projection of the wire layer and a projection of the auxiliary electrode layer onto the substrate 21 in a direction perpendicular to the substrate 21 are in the display region 211.

The common electrode layer and the wire layer are arranged opposite to each other in a direction perpendicular to the substrate 21. The common electrode layer and the wire layer are arranged in separate layers. The auxiliary electrode layer is in the same layer as the common electrode layer. The auxiliary electrode layer and the common electrode layer may be prepared with a same conductive layer or separate conductive layers. In the embodiment of the present disclosure, the auxiliary electrode layer and the common electrode layer are preferably prepared with a same conductive layer. That is, both of the auxiliary electrode layer and the common electrode layer may be formed by patterning a same conductive layer. In another embodiment of the present disclosure, the auxiliary electrode layer and the common electrode layer may be in separate layers and prepared with separate conductive layers.

The common electrode layer may serve as a touch electrode layer, and touch detection may be performed by means of the common electrode layer. The common electrode layer is configured to perform self-capacitive touch detection when the common electrode layer serves as the touch electrode layer. The common electrode layer includes multiple common electrode blocks 22 having a same shape and a same area. Each of the common electrode blocks 22 includes a central electrode 221 and sawtooth-shaped electrodes 222 electrically connected to the central electrode 221. The opposite sawtooth-shaped electrodes 222 of any two adjacent common electrode blocks 22 are fitted with each other.

The common electrode blocks 22 are prepared with a same conductive layer. The multiple common electrode blocks 22 may be formed by patterning the conductive layer. Specifically, multiple common electrode blocks 22 having a preset shape may be formed by patterning the conductive layer with a process of photolithography. A gap K exists between the common electrode blocks 22 fitted to each other.

In touch detection, when a user performs a touch operation, self-capacitance of a common electrode block 22 opposite to the touch location in a direction perpendicular to the substrate 21 varies, and thus the touch detection can be performed by detecting the variation of the self-capacitance of the common electrode blocks. Regarding the common electrode block 22 opposite to the touch location, if the touch location corresponds to a location of the central electrode 221 of the common electrode block 22, only self-capacitance of the common electrode block 22 varies; if the touch location corresponds to a location of a sawtooth-shaped electrode 222 of a first common electrode block 22, self-capacitance varies for not only the first common electrode block 22 but also a second common electrode block 22 having a sawtooth-shaped electrode 222 fitted with the sawtooth-shaped electrode 222 of the first common electrode blocks 22. In this way, it can be detected whether the touch occurs at a location of a central electrode 221 or a location of a sawtooth-shaped electrode 222, and thus the touch detection accuracy is improved compared with a conventional rectangle common electrode block.

The wire layer includes multiple first wires 23 electrically connected to the multiple common electrode blocks 22 in a one-to-one correspondence. Specifically, an insulation layer 25 is arranged between the common electrode layer and the wire layer. The first wires 23 are electrically connected to the common electrode blocks 22 through via holes 26 passing through the insulation layer 25, respectively. In the embodiment shown in FIG. 3, the wire layer is arranged between the substrate 21 and the common electrode layer, which is only for illustration. In other embodiments, the common electrode layer may be arranged between the wire layer and the substrate 21.

The auxiliary electrode layer includes multiple auxiliary electrode blocks 24. In the embodiment shown in FIG. 2, the auxiliary electrode blocks 24 are configured to cause an edge of the common electrode layer near the edge of the substrate 21 to be in a linear structure, and cause the edge of the common electrode layer near the edge of the substrate 21 to be parallel to the edge of the substrate 21. In the embodiment shown in FIG. 2, the auxiliary electrode blocks 24 are arranged separately with each other, and a shape of the auxiliary electrode block 24 is configured according to a shape of a hollow region between the sawtooth-shaped electrodes 222 where the auxiliary electrode block 24 is located.

Sawtooth-shaped electrodes 222 adjacent to edges of the substrate 21 are fitted with the auxiliary electrode blocks 24. A gap K exists between the auxiliary electrode block 24 and the common electrode block 22 which are fitted with each other.

In the embodiment of the present disclosure, the touch screen may operate in a display phase and a touch phase. During the display phase, a common voltage signal is inputted to the common electrode blocks 22 to perform an image display. During the touch phase, the common electrode layer serves as a touch electrode layer to detect a touch operation.

In the embodiment of the present disclosure, the issue of light leakage from pixel electrodes may be avoided by arranging the auxiliary electrode blocks 24 to fill the hollow region between sawtooth-shaped electrodes near edges of the substrate 21, and applying a same common voltage signal to the auxiliary electrode blocks 24 and the common electrode blocks 22 during the display phase.

In the embodiment of the present disclosure, the auxiliary electrode blocks 24 are arranged separately to each other. The touch screen further includes second wires 27 electrically connected to the auxiliary electrode blocks 24 in a one-to-one correspondence. The second wires 27 are configured to provide the common voltage signal to the auxiliary electrode blocks. The second wires 27 may be arranged in the same layer as the first wires 23. That is, the second wires 27 may be formed in the wire layer. The second wires 27 are electrically connected to the auxiliary electrode blocks 24 through via holes 28, respectively. The second wires 27 are connected to an edge wire 29 which is configured to provide the common voltage signal to the second wires 27.

In the embodiment shown in FIG. 2, the auxiliary electrode blocks 24 are separated and are configured to fill the hollow region between sawtooth-shaped electrodes 222 near edges of the substrate 21. In this embodiment, the substrate 21 is in a structure of rectangle. The sawtooth-shaped electrodes 222 and the auxiliary electrode blocks 24 adjacent to a same side of the rectangle have edges towards the side which are flush with each other, in order to ensure the quality of image display.

It should be noted that the above filling is not fully filling, that is, a gap K exists between the sawtooth-shaped electrode 222 and the auxiliary electrode block 24, thereby avoiding a short circuit between the common electrode block 22 and the auxiliary electrode block 24.

Optionally, each of the common electrode blocks 22 is in a centrosymmetric structure. In the embodiment shown in FIG. 2, the central electrode 221 is a rectangle electrode, and at least one of the sawtooth-shaped electrodes 222 is arranged on each side of the rectangle electrode 221. Structures of the sawtooth-shaped electrodes 222 in a same common electrode block 22 may be the same or different, and shapes of the sawtooth-shaped electrodes 222 are not limited herein. The embodiment shown in FIG. 2 is only for illustration, and the number of the common electrode blocks 22 and the number of sawtooth-shaped electrodes 222 in the common electrode blocks 22 are not limited to the embodiment shown in FIG. 2. The common electrode blocks 22 are configured to be in a centrosymmetric structure, which may facilitate the electrode pattern layout and manufacture of the common electrode layer.

Figure 5:
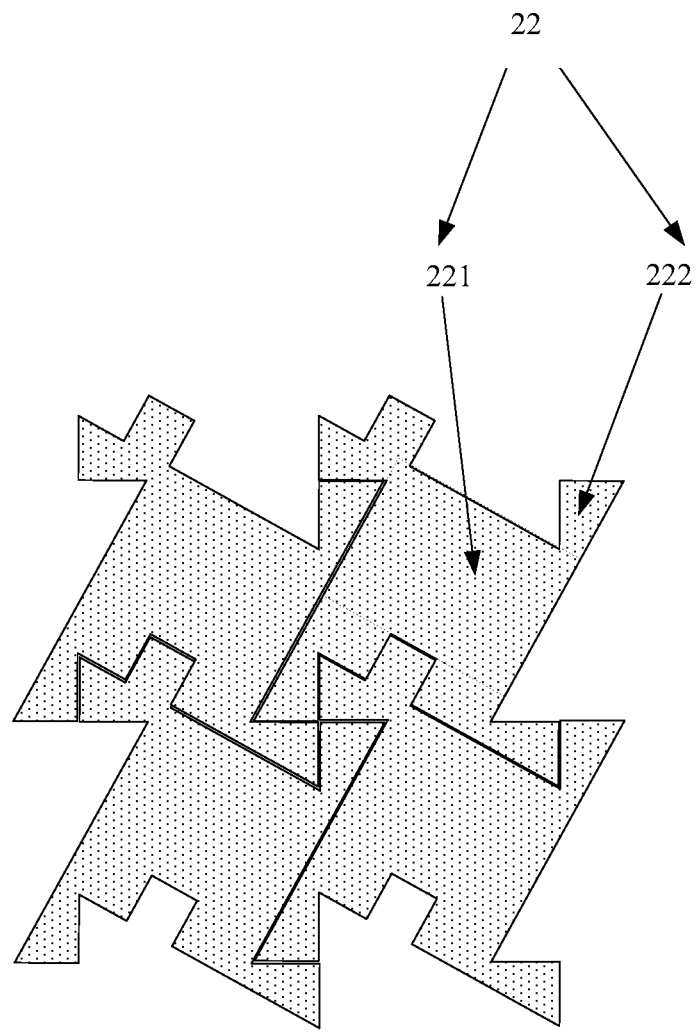
FIG. 5 is a structural schematic diagram of common electrode blocks of a touch screen according to an embodiment of the present disclosure.

In other embodiments, the common electrode blocks 22 may be in a non-centrosymmetric structure, as long as the adjacent common electrode blocks 22 have a same shape and a same area and have sawtooth-shaped electrodes engaged to each other to improve the touch detection accuracy. Reference is made to FIG. 5, which is a structural schematic diagram of common electrode blocks of a touch screen according to an embodiment of the present disclosure. Different from the common electrode block shown in FIG. 4, the common electrode blocks 22 in the embodiment shown in FIG. 5 is in a non-centrosymmetric structure, by which opposite sawtooth-shaped electrodes 222 and central electrodes 221 of two adjacent electrode blocks 22 may also be fitted to each other. In the embodiment shown in FIG. 5, a gap exists between adjacent common electrode blocks 22, but is not shown in FIG. 5.

It should be noted that the shape of the central electrode 221 is not limited to a rectangle, as long as the opposite sawtooth-shaped electrodes and central electrodes of two adjacent electrode blocks may be fitted to each other.

Figure 6:
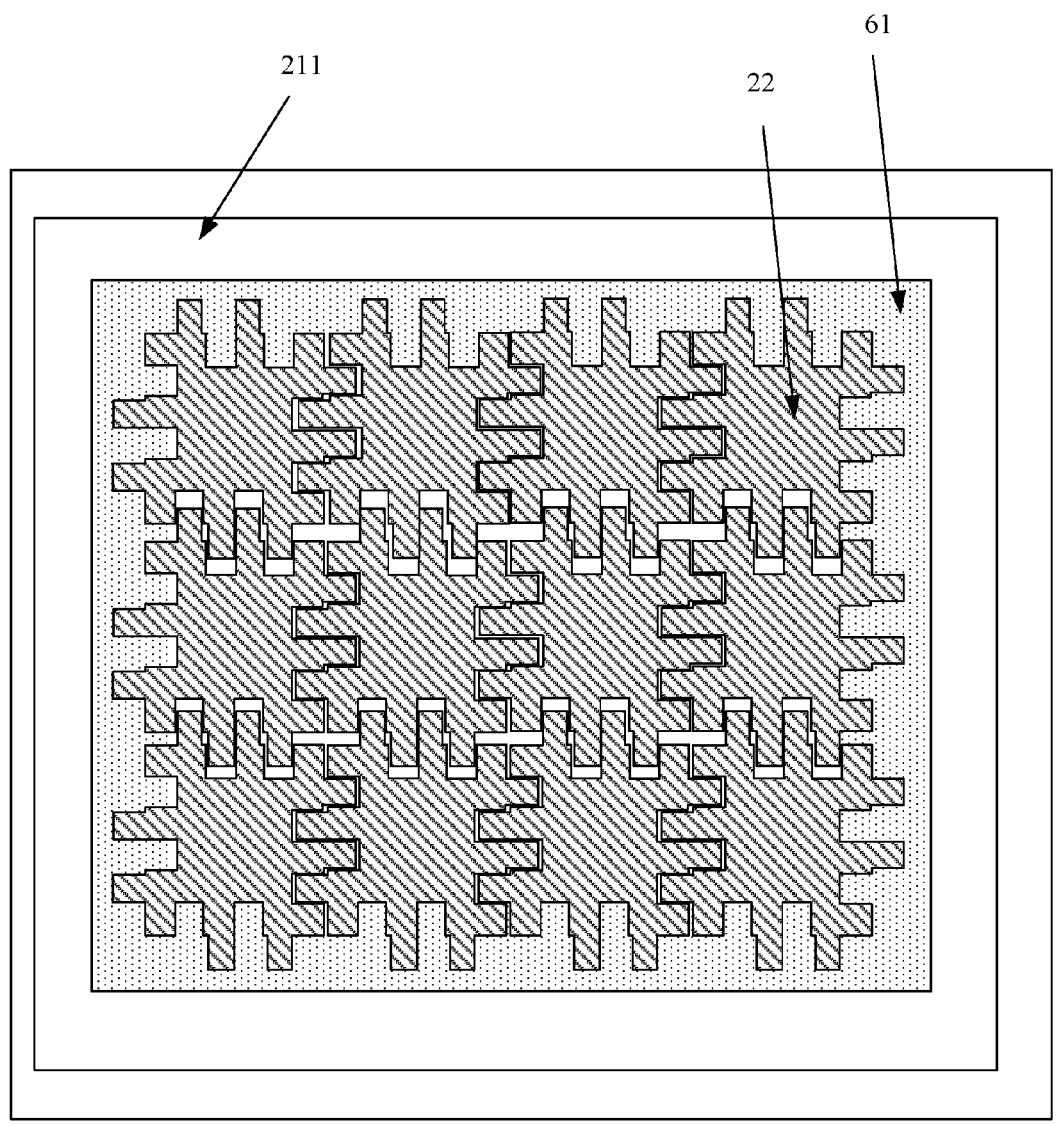
FIG. 6 is a structural schematic diagram of a touch screen according to an embodiment of the present disclosure.

Reference is made to FIG. 6, which is a structural schematic diagram of a touch screen according to an embodiment of the present disclosure. The touch screen shown in FIG. 6 differs from the touch screen shown in FIG. 2 in that auxiliary electrode blocks in the touch screen shown in FIG. 6 may be electrically connected to each other. That is, all of the auxiliary electrode blocks are in a one-piece structure. All of the auxiliary electrode blocks are prepared with a same electrode layer 61. The electrode layer 61 includes a hollow region and an electrode region around the hollow region. The electrode layer 61 is within the display region 211 of the substrate. In this case, a projection of the common electrode layer onto the substrate is within a projection of the hollow region onto the substrate in the direction perpendicular to the substrate; and the auxiliary electrode blocks are in the electrode region. In this embodiment, the electrode layer 61 and the common electrode layer may be prepared with a same conductive layer, that is, the electrode layer 61 and the common electrode layer are formed in preset shapes by patterning the conductive layer with a process of photolithography. In this case, only one second wire is arranged to provide the common voltage signal to all of the auxiliary electrode blocks.

It should be noted that, in the embodiment shown in FIG. 6, a gap exists between the electrode layer 61 and the common electrode blocks 22, but is not shown in FIG. 6.

In summary, the touch screen according to the embodiment of the present disclosure has higher touch detection accuracy, and is free of the issue of visible edge shape of the touch screen and the issue of light leakage from pixel electrodes near edges of the substrate.

Figure 7:
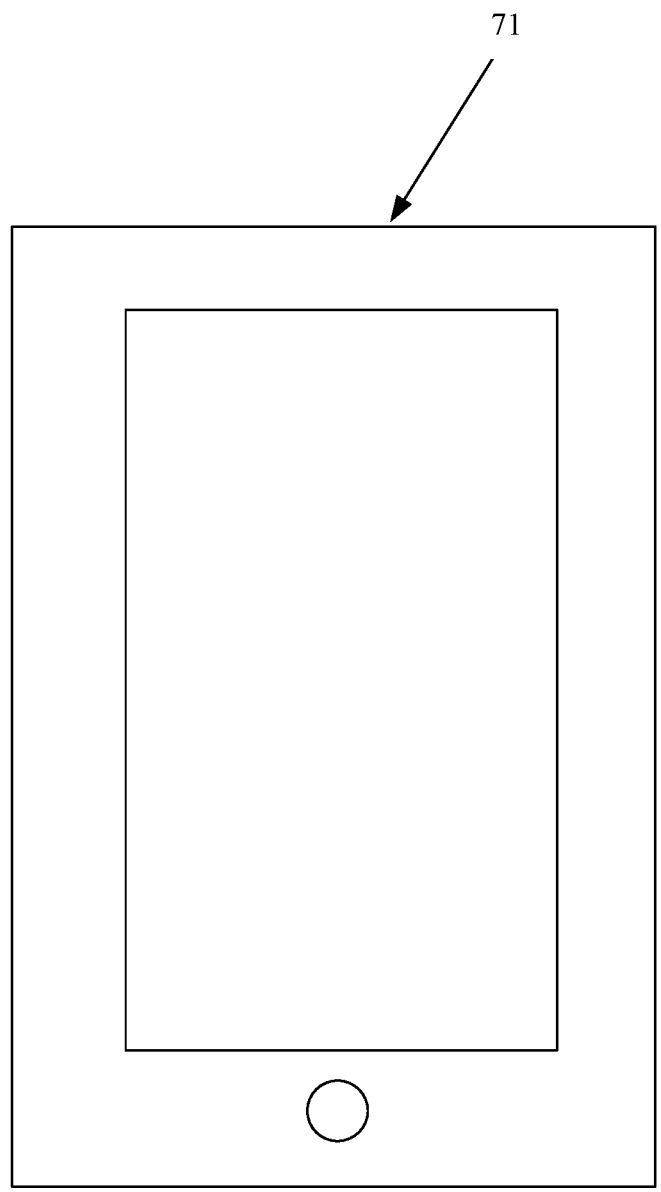
FIG. 7 is a structural schematic diagram of an electronic device according to an embodiment of the present disclosure.

An electronic device is also provided according to an embodiment of the present disclosure. The electrode device is shown in FIG. 7, which is a structural schematic diagram of the electronic device according to the embodiment of the present disclosure. The electronic device 71 includes the touch screen according to the above embodiments. The electronic device may be, for example, a mobile phone, a panel computer, a notebook computer or other electronic devices having a function of touch display.

Since the above touch screen is applied in the electronic device, the electronic device has higher touch detection accuracy, and is free of the issue of visible edge shape and the issue of light leakage from pixel electrodes near the edges of the substrate.

According to the above description of the disclosed embodiments, those skilled in the art can implement or practice the present disclosure. Many changes to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A touch screen, comprising: a substrate; and an auxiliary electrode layer, a common electrode layer and a wire layer arranged on a same side of the substrate, wherein the common electrode layer and the wire layer are arranged opposite to each other in a direction perpendicular to the substrate; the common electrode layer comprises a plurality of common electrode blocks having a same shape and a same area, each of the common electrode blocks comprising a central electrode and sawtooth-shaped electrodes electrically connected to the central electrode, wherein opposite sawtooth-shaped electrodes of any two adjacent common electrode blocks are fitted with each other; the wire layer comprises a plurality of first wires electrically connected to the plurality of common electrode blocks in a one-to-one correspondence; the auxiliary electrode layer comprises a plurality of auxiliary electrode blocks; the sawtooth-shaped electrodes adjacent to edges of the substrate are fitted with the auxiliary electrode blocks; and the common electrode blocks are configured to perform a control of image display 20 by receiving a common voltage signal while the common voltage signal is inputted to the auxiliary electrode blocks.

2. The touch screen according to claim 1, wherein the substrate comprises a display region and a border region around the display region; and a projection of the common electrode layer, a projection of the wire layer and a projection of the auxiliary electrode layer onto the substrate in a direction perpendicular to the substrate are in the display region.

3. The touch screen according to claim 1, wherein an insulation layer is arranged between the common electrode layer and the wire layer; and the first wires are electrically connected to the corresponding common electrode blocks through via holes passing through the insulation layer, respectively.

4. The touch screen according to claim 1, wherein the auxiliary electrode layer and the common electrode layer are prepared with a same conductive layer.

5. The touch screen according to claim 1, wherein the auxiliary electrode layer and the common electrode layer are prepared with two separate conductive layers.

6. The touch screen according to claim 1, wherein each of the common electrode blocks is in a centrosymmetric structure.

7. The touch screen according to claim 6, wherein the central electrode is a rectangle electrode; and at least one of the sawtooth-shaped electrodes is arranged on each side of the rectangle electrode.

8. The touch screen according to claim 1, wherein the common electrode layer serves as a touch electrode layer during a touch phase.

9. The touch screen according to claim 8, wherein the common electrode layer is configured to perform a self-capacitive touch detection when the common electrode layer serves as the touch electrode layer.

10. The touch screen according to claim 1, wherein the auxiliary electrode blocks are arranged separately to each other; the touch screen further comprises second wires electrically connected to the auxiliary electrode blocks in a one-to-one correspondence; and the second wires are configured to provide the common voltage signal to the auxiliary electrode blocks.

11. The touch screen according to claim 10, wherein the substrate is in a shape of a rectangle; and the sawtooth-shaped electrodes and the auxiliary electrode blocks adjacent to a same side of the rectangle have edges towards the side which are flush with each other.

12. The touch screen according to claim 1, wherein the auxiliary electrode blocks are electrically connected to each other; all of the auxiliary electrode blocks are prepared with a same electrode layer which comprises a hollow region and an electrode region around the hollow region; a projection of the common electrode layer onto the substrate is within a projection of the hollow region onto the substrate in the direction perpendicular to the substrate; and the auxiliary electrode blocks are in the electrode region.

13. A touch display electronic device, comprising a touch screen, wherein the touch screen comprises: a substrate; and an auxiliary electrode layer, a common electrode layer and a wire layer arranged on a same side of the substrate, wherein the common electrode layer and the wire layer are arranged opposite to each other in a direction perpendicular to the substrate; the common electrode layer comprises a plurality of common electrode blocks having a same shape and a same area, each of the common electrode blocks comprises a central electrode and sawtooth-shaped electrodes electrically connected to the central electrode, and opposite sawtooth-shaped electrodes of any two adjacent common electrode blocks are fitted with each other; the wire layer comprises a plurality of first wires electrically connected to the plurality of common electrode blocks in a one-to-one correspondence; the auxiliary electrode layer comprises a plurality of auxiliary electrode blocks; the sawtooth-shaped electrodes adjacent to edges of the substrate are fitted with the auxiliary electrode blocks; and the common electrode blocks performs a control of image display by receiving a common voltage while the common voltage signal is inputted to the auxiliary electrode blocks.

* * * * *